(12) United States Patent
Roberts et al.

(10) Patent No.: US 8,177,382 B2
(45) Date of Patent: May 15, 2012

(54) APPARATUS AND METHODS FOR MULTIPLANAR OPTICAL DIFFUSERS AND DISPLAY PANELS FOR USING THE SAME

(75) Inventors: John Roberts, Grand Rapids, MI (US); Chenhua You, Cary, NC (US)

(73) Assignee: Cree, Inc., Durham, NC (US)

( * ) Notice: Subject to any disclaimer, the term of this patent is extended or adjusted under 35 U.S.C. 154(b) by 278 days.

(21) Appl. No.: 12/045,729

(22) Filed: Mar. 11, 2008

(65) Prior Publication Data

US 2009/0231835 A1    Sep. 17, 2009

(51) Int. Cl.
*G09F 13/08* (2006.01)
(52) U.S. Cl. .................... 362/97.4; 362/616
(58) Field of Classification Search .......... 362/612, 362/616–622, 624–629, 634, 97.1–97.4
See application file for complete search history.

(56) References Cited

U.S. PATENT DOCUMENTS

| | | |
|---|---|---|
| 4,675,575 A | 6/1987 | Smith et al. |
| 5,477,436 A | 12/1995 | Bertling et al. |
| 6,330,111 B1 | 12/2001 | Myers |
| 6,331,915 B1 | 12/2001 | Myers |
| 6,657,393 B2 | 12/2003 | Natsume |
| 6,932,497 B1 | 8/2005 | Huang |
| 6,979,102 B2 * | 12/2005 | You ........................... 362/218 |
| 7,036,956 B1 * | 5/2006 | Chou .......................... 362/246 |
| 7,355,284 B2 | 4/2008 | Negley |
| 2002/0054495 A1 | 5/2002 | Natsume |
| 2004/0096666 A1 | 5/2004 | Knox et al. |
| 2004/0105251 A1 * | 6/2004 | Yu et al. ........................... 362/31 |
| 2004/0136172 A1 * | 7/2004 | Boyd et al. ...................... 362/31 |
| 2005/0058947 A1 | 3/2005 | Rinehart et al. |
| 2005/0058948 A1 | 3/2005 | Freese et al. |
| 2005/0058949 A1 | 3/2005 | Wood et al. |
| 2005/0168689 A1 | 8/2005 | Knox |
| 2006/0061869 A1 | 3/2006 | Fadel et al. |
| 2006/0114569 A1 | 6/2006 | Capaldo et al. |
| 2006/0152931 A1 | 7/2006 | Holman |
| 2006/0158899 A1 | 7/2006 | Ayabe et al. |
| 2006/0164729 A1 | 7/2006 | Wood |
| 2006/0256582 A1 * | 11/2006 | Chuang ........................ 362/620 |
| 2006/0275714 A1 | 12/2006 | Rinehart et al. |
| 2006/0285332 A1 | 12/2006 | Goon et al. |
| 2007/0003868 A1 | 1/2007 | Wood et al. |
| 2007/0008738 A1 | 1/2007 | Han et al. |

(Continued)

FOREIGN PATENT DOCUMENTS

| | | |
|---|---|---|
| EP | 1 653 255 | 5/2006 |
| EP | 1 681 509 | 7/2006 |

(Continued)

OTHER PUBLICATIONS

U.S. Appl. No. 12/174,053, filed Jul. 16, 2008, Negley.

(Continued)

*Primary Examiner* — Julie Shallenberger

(74) *Attorney, Agent, or Firm* — Myers Bigel Sibley & Sajovec

(57) ABSTRACT

Provided are solid state lighting devices that include multiple solid state light emitters that are configured to emit light and a multiplane light diffuser including a first diffusion plane and a second diffusion plane that are separated by a gap, the multiplane light diffuser including first side that is configured to receive the light emitted from the solid state light emitters and a second side that is configured to transmit diffused light.

20 Claims, 5 Drawing Sheets

U.S. PATENT DOCUMENTS

| | | | |
|---|---|---|---|
| 2007/0014004 A1 | 1/2007 | Wood | |
| 2007/0019419 A1* | 1/2007 | Hafuka et al. | 362/373 |
| 2007/0047204 A1 | 3/2007 | Parker et al. | |
| 2007/0127098 A1 | 6/2007 | Wood | |
| 2007/0127129 A1 | 6/2007 | Wood et al. | |
| 2007/0195224 A1 | 8/2007 | Chang | |
| 2008/0002391 A1* | 1/2008 | Lee | 362/97 |
| 2008/0111949 A1 | 5/2008 | Shibata et al. | |

FOREIGN PATENT DOCUMENTS

| | | |
|---|---|---|
| FR | 2 586 844 | 3/1987 |
| FR | 2 759 188 | 8/1998 |
| FR | 2 814 220 | 3/2002 |
| JP | 05-100106 | 4/1993 |
| JP | 2007-076666 A | 3/2007 |
| JP | 2008-034342 A | 2/2008 |
| WO | WO 03/044870 | 5/2003 |
| WO | WO 2007/026776 | 3/2007 |
| WO | WO 2007/032454 A1 | 3/2007 |
| WO | WO 2007/088655 A1 | 8/2007 |

OTHER PUBLICATIONS

U.S. Appl. No. 11/949,222, filed Dec. 3, 2007, Negley.

U.S. Appl. No. 11/949,182, filed Dec. 3, 2007, Negley.

International Search Report and Written Opinion (14 pages) corresponding to International Application No. PCT/US2008/070132; Mailing Date: Oct. 14, 2008.

International Search Report and Written Opinion (14 pages) corresponding to International Application No. PCT/US2007/086237; Mailing Date: May 8, 2008.

International Search Report and Written Opinion (14 pages) corresponding to International Application No. PCT/US2007/086242; Mailing Date: Mar. 4, 2008.

Extended European Search Report (10 pages) corresponding to European Application No. 09154919.6; Dated: May 8, 2009.

Second Examination Report (7 pages) corresponding to European Application No. 09154919.6; Dated: Feb. 4, 2011.

* cited by examiner

APPARATUS AND METHODS FOR MULTIPLANAR OPTICAL DIFFUSERS AND DISPLAY PANELS FOR USING THE SAME

FIELD OF THE INVENTION

The present invention relates to solid state lighting, and more particularly to tiles and/or panels including solid state lighting components.

BACKGROUND

Panel lighting devices are used for a number of lighting applications. A lighting panel may be used, for example, as a backlighting unit (BLU) for an LCD display. Backlighting units commonly rely on an arrangement of cold cathode fluorescent lamps (CCFL's) within a reflective enclosure. For example, referring to FIG. 1, which is a side view of a backlighting unit of the prior art, multiple CCFL's 1 can be arranged between a reflective surface 2 and an LCD panel 3. Light from the CCFL's 1 can be reflected from the reflective surface 2 and partially reflected from the inside surface of the LCD panel 3. A portion of the light directed to the LCD panel 3 can transmitted to provide illumination for the LCD panel 3. The combination of the light directly transmitted to the LCD panel 3 from the CCFL's 1 and the reflected light from the various surfaces can create a relatively uniform backlighting unit. The CCFL's 3, however, can require higher than signal level voltages and can generate undesirable amounts of heat, which can be problematic to dissipate.

SUMMARY

A solid state lighting device according to some embodiments of the invention includes multiple solid state light emitters that are configured to emit light and a multiplane light diffuser including a first diffusion plane and a second diffusion plane that are separated by a gap. The multiplane light diffuser includes a first side that is configured to receive the light emitted from the solid state light emitters and a second side that is configured to transmit diffused light.

In some embodiments, the multiplane light diffuser includes a diffuser plate that includes the first side of the multiplane light diffuser and is positioned a first distance from the solid state light emitters. The diffuser plate is configured to define the first diffusion plane. The diffuser further includes a diffuser sheet that includes the second side of the multiplane light diffuser and is positioned a second distance from the solid state light emitters. The diffuser sheet is configured to define the second diffusion plane and the first distance is less than the second distance. In some embodiments, the diffuser sheet includes a substantially transparent plate and a diffuser film supported by the substantially transparent plate. In some embodiments, the diffuser sheet includes a diffuser film, a brightness enhancing film, a polarizing film and a substantially clear plate configured to support the diffuser film, the brightness enhancing film, and the polarizing film.

Some embodiments may include multiple diffuser supports. In such embodiments, the diffuser supports may include a proximal end that is configured to be positioned proximate the solid state light emitters and a distal end that is configured to support the diffuser sheet. In some embodiments, the diffuser plate includes multiple diffuser plate holes that are configured to receive the diffuser supports.

In some embodiments, the diffuser supports include steps for supporting, at the first distance from the plurality of solid state light emitters, the diffuser plate via the plurality of holes. Some embodiments provide that the diffuser sheet includes a diffuser film and a substantially clear plate configured to receive the diffuser film.

In some embodiments, the solid state emitters include a third distance between adjacent ones of the plurality of solid state light emitters and the first distance is about one half the third distance. In some embodiments, the solid state emitters include a third distance between adjacent ones of the solid state light emitters and the second distance includes a distance in a range between the third distance and 1.5 times the third distance.

In some embodiments, the diffuser plate includes a scattering diffuser. Some embodiments provide that the diffuser plate includes a structured refractive diffuser. Some embodiments may include means for transmitting first diffused light from the first diffusion plane to the second diffusion plane.

In some embodiments, the multiplane light diffuser includes a first diffuser plate positioned at a first distance from the plurality of solid state emitters, a second diffuser plate positioned at a second distance from the plurality of solid state emitters, and a diffuser sheet supported by the second diffuser plate such that the first distance is less than the second distance.

Some embodiments of the present invention may also include methods of providing diffused light. Some embodiments of such methods may include emitting light from multiple solid state light emitters arranged in a planar configuration, receiving the emitted light at a first side of a first diffusion plane that is a first distance from the solid state light emitters and transmitting first diffused light from a second side of the first diffusion plane. Methods according to some embodiments may include receiving the first diffused light from the first diffusion plane at a first side of a second diffusion plane that is a second distance from the solid state light emitters and transmitting second diffused light from a second side of the second diffusion plane.

In some embodiments, transmitting the first diffused light includes transmitting light from a diffuser plate and transmitting the second diffused light includes transmitting light from a diffuser sheet that is supported by a substantially transparent sheet.

In some embodiments, transmitting the first diffused light includes transmitting first diffused light from a first diffuser plate and transmitting the second diffused light includes transmitting second diffused light from a diffuser sheet that is supported by a second diffuser plate. In some embodiments, transmitting the first diffused light includes transmitting scattered diffusion light from a scattering diffuser plate. Some embodiments provide that transmitting the first diffused light includes transmitting the first diffused light from a structured refractive diffuser.

In some embodiments, the solid state light emitters include a third distance between adjacent ones of the solid state light emitters such that the first distance is about one half of the third distance, and the second distance includes a value in a range between substantially the third distance value and substantially 1.5 times the third distance value.

Some embodiments of the present invention include a display that includes a backlighting panel. In some embodiments, a backlighting panel may include multiple solid state light emitters arranged in a substantially planar configuration. A first diffusion plane is configured to receive light from the solid state light emitters and to transmit first diffused light. A second diffusion plane is configured to receive the first diffused light and to transmit second diffused light. The panel includes multiple diffuser supports configured to support a first diffuser plane structure at a first distance from the solid state light emitters and to support a second diffuser plane structure at a second distance from the solid state light emitters, wherein the second distance is greater than the first distance. In some embodiments, the display may also include a LCD display panel that is configured to receive the second diffused light and selectively transmit received light as display content.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION OF EMBODIMENTS OF THE INVENTION

Figure 1:
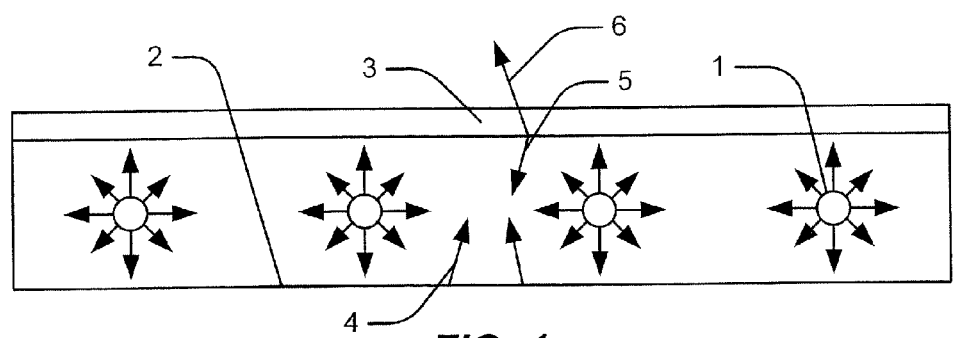
FIG. 1 is a side cross-sectional view of a CCFL backlighting panel as known in the prior art.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
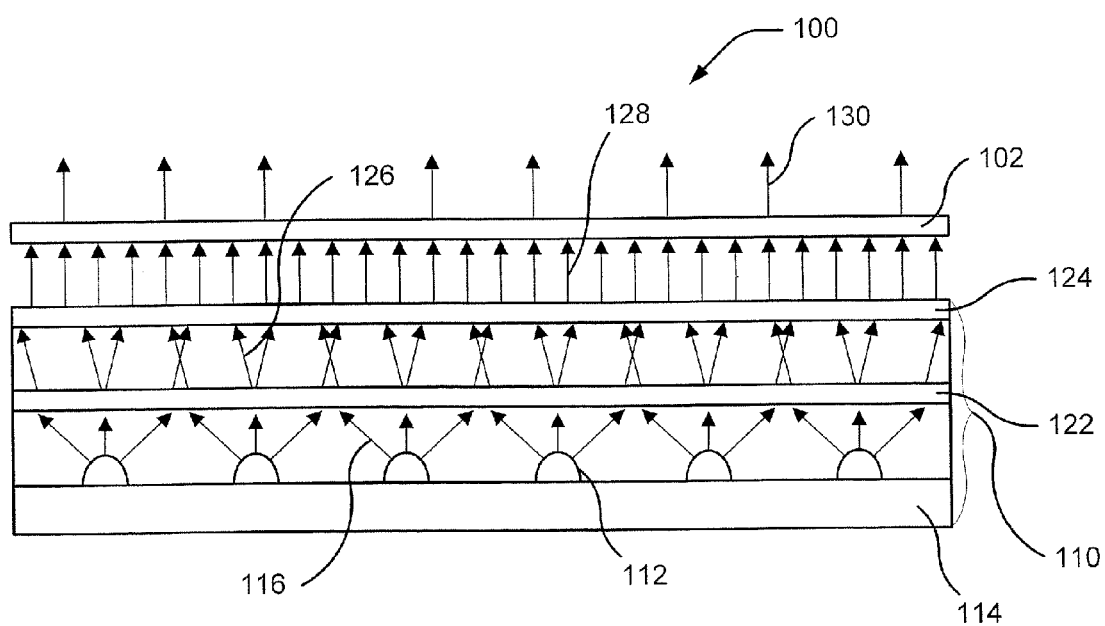
FIG. 2 is a side cross-sectional view of a display including a solid state lighting device in accordance with some embodiments of the invention.

Reference is now made to FIG. 2, which is a side cross-sectional view of a display 100 including a solid state lighting device in accordance with some embodiments of the invention. A display 100 includes a backlighting panel 110 configured to transmit diffused light 128 to an LCD display panel 102. The LCD display panel 102 is configured to selectively transmit the received diffused light 128 as display content 130.

The backlighting panel 110 may include multiple light emitters 112 arranged on an emission source support structure 114. In some embodiments and as illustrated in FIG. 2, the emission source support structure 114 may be substantially planar such that the multiple light emitters 112 are arranged in a substantially planar configuration.

In some embodiments, the light emitters 112 include, for example, solid state light emitting devices. Some embodiments provide solid state lighting devices that may include, for example, a packaged light emitting device including one or more light emitting diodes (LEDs). In some embodiments, light emitters 112 may include one or more LED emitter chips that are configured to emit light having one or more dominant wavelengths. In some embodiments, light emitters 112 may include white LED lamps that include a blue-emitting LED coated with a fluorescing compound that may modify the wavelength of at least some light that is emitted from the blue light emitting LED. In some embodiments, the fluorescing compound may include a wavelength conversion phosphor that converts some of the blue light emitted by the LED into yellow light. The resulting light, which is a combination of blue light and yellow light, may appear white to an observer.

The backlighting panel 110 may include a first diffusion plane 122 that is configured to receive light from the light emitters 112 and to transmit first diffused light 126. In some embodiments, the first diffusion plane 122 may include a diffuser plate. In some embodiments, the diffuser plate may be a simple scattering diffuser such as a plate including a light filter color and/or pigment. In some embodiments, the diffuser plate may include a surface embossed diffuser, a louvered diffuser and/or a structured refractive diffuser, among others. The backlighting panel 110 may include one or more reflective structures and/or surfaces (not shown) that may be configured to recycle portions of emitted light that is not initially transmitted by the first diffusion plane 122.

The backlighting panel 110 may include a second diffusion plane 124 that is configured to receive the first diffused light from the first diffusion plane 122 and to transmit second diffused light 128 to the LCD display panel 102. In some embodiments, the second diffusion plane 124 may include a diffuser sheet that is positioned between the diffuser plate 122 and the LCD display panel 102. Some embodiments provide that the difference between the first distance and the second distance creates a gap between the first diffusion plane 122 and the second diffusion plane 124. In some embodiments, the gap may be determined as a function of a distance between adjacent ones of the light emitters 112.

Figure 3:
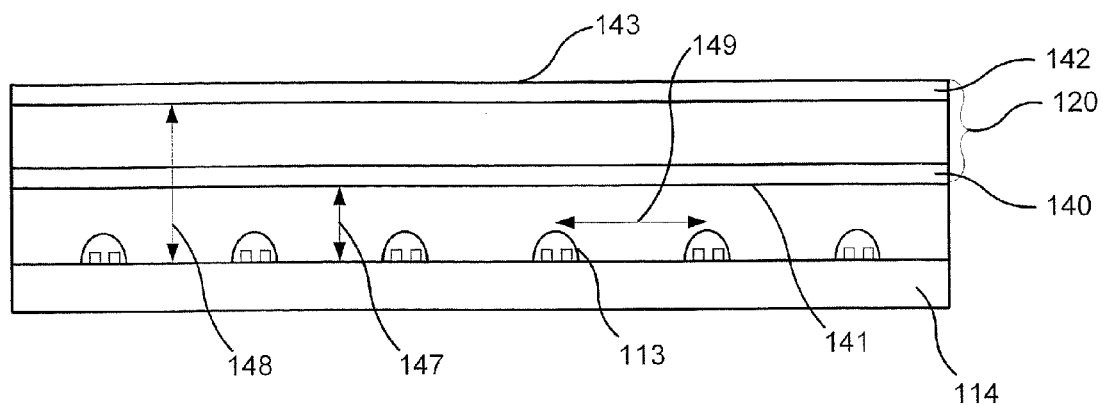
FIG. 3 is a side cross-sectional view of a solid state lighting device in accordance with some embodiments of the invention.

Reference is now made to FIG. 3, which is a side cross-sectional view of a solid state lighting device in accordance with some embodiments of the invention. A solid state lighting device may include multiple solid-state light emitters 113 that may be supported by a support structure 114. In some embodiments, the support structure 114 includes a substantially planar geometry, however, embodiments described herein are not thus limited. For example, in some embodiments, the support structure 114 may include curved and/or curvilinear cross-sections in one or more directions. Accordingly, diffusion components that are illustrated as generally planar may include curved and/or curvilinear cross-sections in one or more directions that may be consistent with the support structure 114.

The solid state light emitters 113 may include one or more LED emitter chips that are configured to emit light having one or more dominant wavelengths. In some embodiments, solid-state light emitters 113 may include white LED lamps that include a blue-emitting LED coated with a fluorescing compound that may modify the wavelength of light that is emitted from the blue light emitting LED. In some embodiments, the fluorescing compound may include a wavelength conversion phosphor that converts some of the blue light emitted by the LED into yellow light. The resulting light, which is a combination of blue light and yellow light, may appear white to an observer.

In some embodiments, the solid state lighting device may include a multiplane light diffuser 120. A multiplane light diffuser 120 may be configured to receive light emitted from the solid state light emitters 113 into a first side 141 and transmit diffused light from a second side 143. In some embodiments, the multiplane light diffuser 120 may include a first diffusion plane that includes the first side 141 and a second diffusion plane that includes the second side 143, such that the first diffusion plane and the second diffusion plane are separated by a gap. In the case of a substantially non-planar arrangement of solid state light emitters 113, the multiplane light diffuser 120 may be more accurately termed a "multi-layer" light diffuser since the diffusion components may not be limited to a planar configuration.

The first diffusion plane that includes the first side of the multiplane light diffuser may include a diffuser plate 140. The diffuser plate 140 may be positioned a first distance 147 from a surface defined by the solid state light emitters 113. The diffuser plate 140 may include a scattering diffuser. In some embodiments, a scattering diffuser may include a light filter and/or pigment. In some embodiments, a scattering diffuser may include an embossed surface. The diffuser plate 140 may include a structured refractive diffuser that may include multiple refractive structures arranged on one or more surfaces of the diffuser plate 140. In some embodiments, the diffuser plate 140 may be a polycarbonate and/or acrylic material and may include prismatic pillows and/or extrusions on one or both sides. Some embodiments provide that a structured refractive diffuser includes multiple crossed linear prismatic lenselets. In some embodiments, a pattern of lenselets, prismatic pillows and/or refractive structures may be arranged in a pitch of approximately ½ to 2 times the pitch of the pattern of solid state light emitters 113.

The second diffusion plane that includes the second side of the multiplane light diffuser 120 may include a diffuser sheet 142. The diffuser sheet 142 may be positioned a second distance 148 from the surface defined by the solid state light emitters 113, such that the second distance 148 is greater than the first distance 147. The diffuser sheet 142 may be configured to receive light from the diffuser plate 140 and transmit light through the second surface 143 of the multiplane diffuser 120.

In some embodiments, the first distance 147 and the second distance 148 may be determined as a function of a third distance 149, which may be the distance between adjacent ones of the solid state light emitters 113. Some embodiments provide that the first distance 147 may be approximately ½ the third distance 149. In some embodiments, the second distance 148 may be in a range including and the third distance 149 and 1.5 times the third distance 149.

Figure 4:
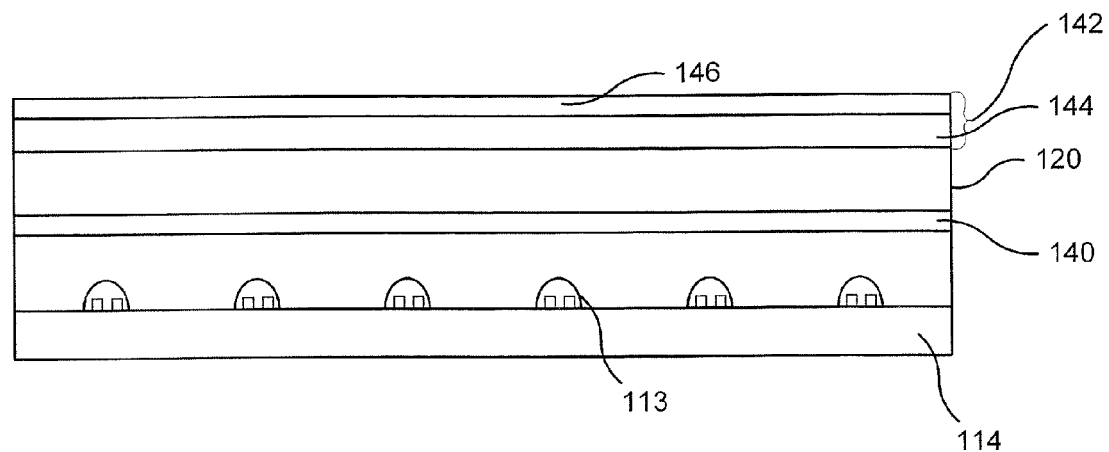
FIG. 4 is a side cross-sectional view of a solid state lighting device in accordance with some embodiments of the invention.

Reference is now made to FIG. 4, which is a side cross-sectional view of a solid state lighting device in accordance with some embodiments of the invention. The solid state lighting device may include multiple solid state light emitters 113, a support structure 114 and a multiplane diffuser 120 that includes a diffuser plate 140 and a diffuser sheet 142, as described above regarding FIG. 3. In some embodiments, the diffuser sheet 142 may include a substantially transparent plate 144 that is configured to support a diffuser film 146. In some embodiments, the diffuser sheet 142 may also include other films such as a prismatic brightness enhancing film (BEF) and/or a multilayer based reflective polarizer film (DBEF) (Not shown). Commercial examples of such films may include products such as those available under the name Vikuiti™, among others.

Figure 5A:
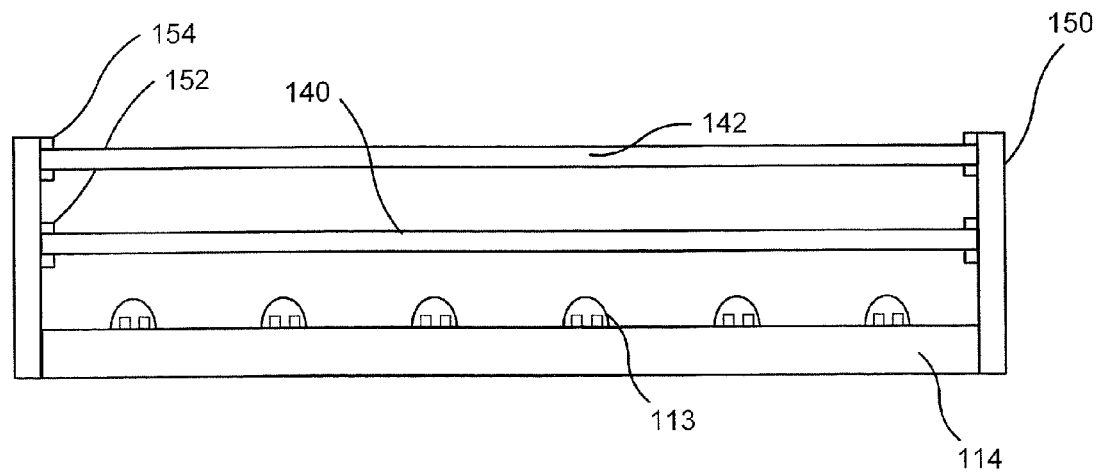
FIGS. 5A-5D are side cross-sectional views of solid state lighting devices illustrating different diffuser supports in accordance with some embodiments of the invention.

Reference is now made to FIGS. 5A-5D, which are side cross-sectional views of solid state lighting devices illustrating different diffuser supports in accordance with some embodiments of the invention. The solid state lighting device may include multiple solid state light emitters 113, a support structure 114 and a multiplane diffuser 120 that includes a diffuser plate 140 and a diffuser sheet 142, as described above regarding FIG. 3. In some embodiments, a solid state lighting device may include structural components that are configured to support the diffuser plate 140 and/or diffuser sheet 142. Referring to FIG. 5A, the solid state lighting device may include device housing sidewalls 150. Diffuser plate edge supports 152 may be attached to, supported by and/or integrally formed into one or more of the device housing sidewalls 150. In this manner, the edges of the diffuser plate 140 may be supported at the first distance 147 (FIG. 3) from the multiple solid-state light emitters 113. Diffuser sheet edge supports 154 may be attached to, supported by and/or integrally formed into one or more of the device housing sidewalls 150. In this manner, the edges of the diffuser sheet 142 may be supported at the second distance 148 (FIG. 3) from the multiple solid-state lighting emitters 113.

Figure 5B:
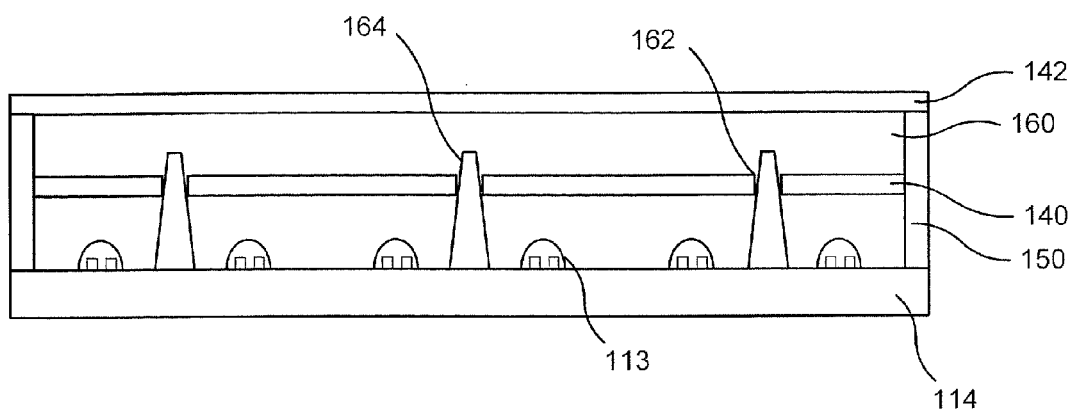

Referring now to FIG. 5B, the solid state lighting device may include multiple diffuser supports 164 that are configured to support the diffuser plate 140 via contact with, attachment to and/or mounting to the support structure 114. In some embodiments, the diffuser supports 164 may be supported by the support structure 114 and/or a device housing member (not shown) and be received by multiple diffuser plate holes 162. In some embodiments, the diffuser supports 164 may be configured to include one or more gradient surfaces, such as, for example, in a wedge and/or cone shape, among others. In some embodiments, the first distance 147 (FIG. 3) may be controlled by varying the size of the diffuser plate holes 162. For example, in the circumstance when the diffuser supports 164 include a conical geometry, a diffuser plate 140 including smaller diffuser plate holes 162 would be positioned at a greater first distance 147 (FIG. 3) than a diffuser plate 140 including larger diffuser plate holes 162.

In some embodiments, the diffuser plate 140 may include diffuser plate holes 162 including more than one size such that the first distance 147 (FIG. 3) may be determined by the orientation of the diffuser plate 140 and/or the location of the diffuser supports 164. Stated differently, one set of diffuser plate holes 162 may be sized to position the diffuser plate 140 at a smaller first distance 147 (FIG. 3) than another set of diffuser plate holes 162. In this regard, the location of the diffuser supports 164 determines which set of diffuser plate holes 162 receive the diffuser supports 164. Thus a changing the locations of the diffuser supports 164, the first distance 147 (FIG. 3) may be determined.

In some embodiments, the diffuser sheet 142 may be supported by a housing side wall 150 and/or other type of structure to maintain the gap 160 between the diffuser plate 140 and the diffuser sheet 142.

Figure 5C:
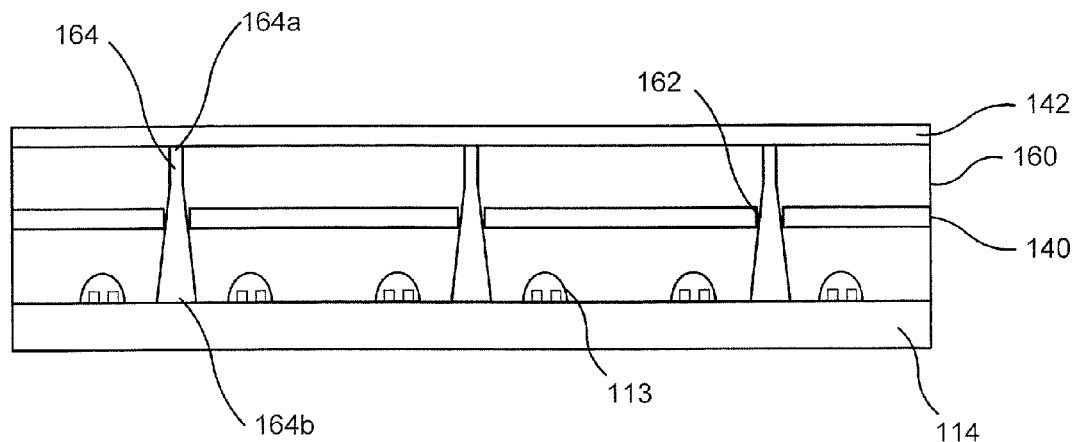

Referring now to FIG. 5C, in some embodiments the diffuser supports 164 may be configured to support the diffuser plate 140 and the diffuser sheet 142. In some embodiments, the diffuser supports 164 may include a proximal end 164*b* that is configured to engage, contact, attach to, mount on, and/or be integrally formed in the support structure 114 and/or other device housing component. The diffuser supports 164 may include a distal end 164*a* that is configured to be received by the diffuser plate holes 162 and to support the diffuser sheet 142. In this regard, the distal end 164*a* may support the diffuser sheet 142 and a gradient surface on the diffuser support 164 may support the diffuser plate 140.

Figure 5D:
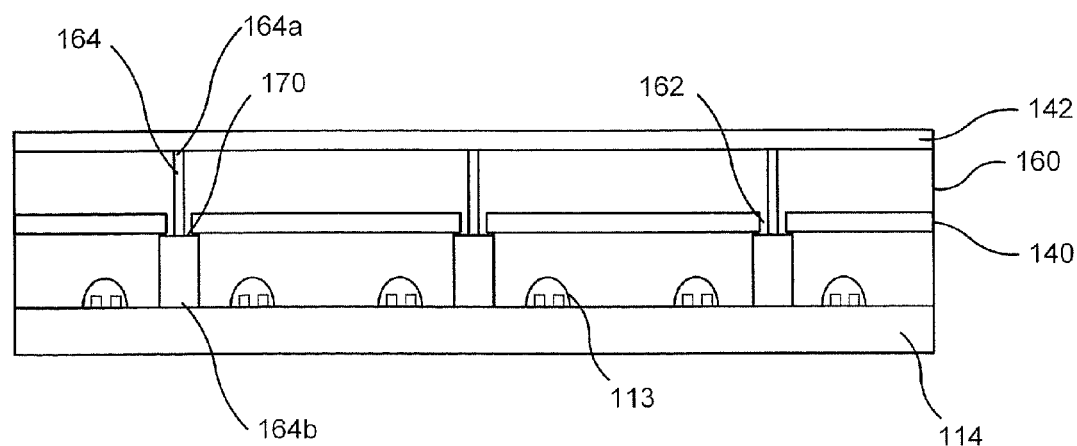

Referring now to FIG. 5D, the diffuser supports 164 may include diffuser plate support steps 170 that are configured to position the diffuser plate 140 at the first distance 147 (FIG. 3). In some embodiments, the support steps 170 may include a surface defined by a portion of greater diameter and/or cross-sectional size than the diffuser plate holes 162. In some embodiments, the support steps 170 may include protrusions, such as wedge and/or tee structures, among others that are larger than the diameter and/or cross-section size of the diffuser plate holes 162, but do not extend to the proximal end 164*b*. The relative placement of the support steps 170 on the diffuser supports 164 may determine the first distance 147 (FIG. 3) and the overall length of the diffuser supports 164 may determine the second distance 148 (FIG. 3).

Figure 6A:
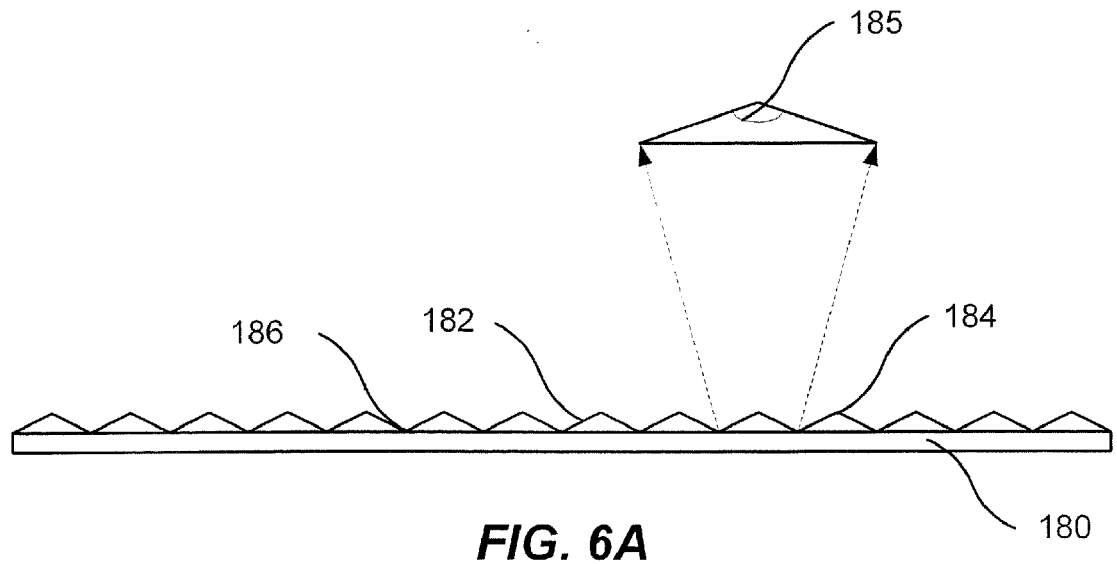
FIGS. 6A-6B are side a cross-sectional view and a top view, respectively, of a structured refractive diffuser in accordance with some embodiments of the invention.
Figure 6B:
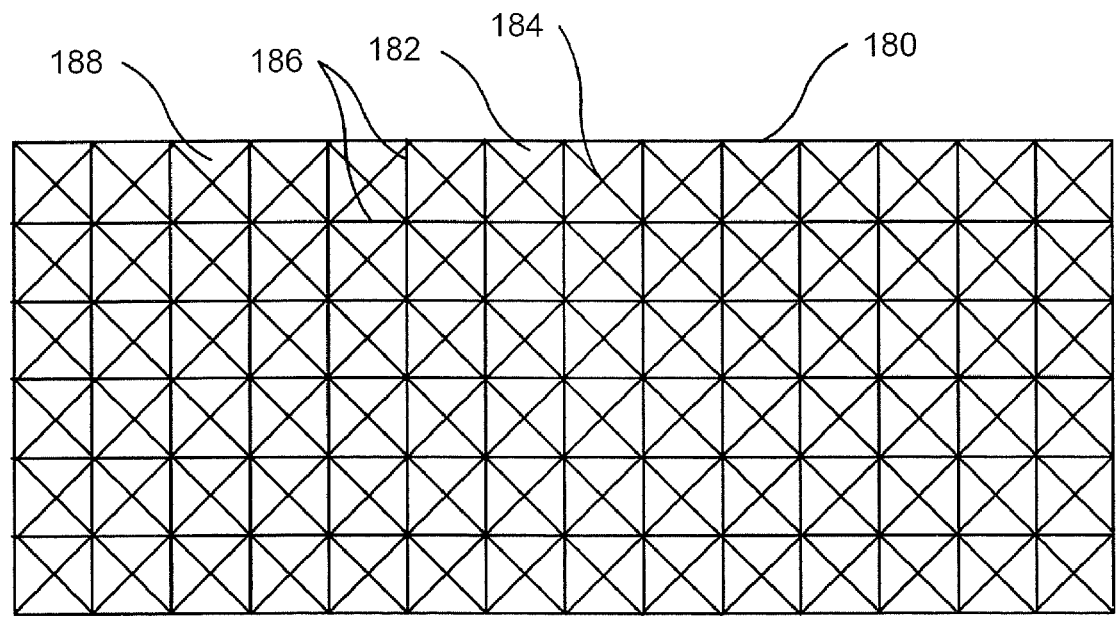

Reference is now made to FIGS. 6A-6B, which are side a cross-sectional view and a top view, respectively, of a structured refractive diffuser in accordance with some embodiments of the invention. Referring to FIG. 6A, a structured refractive diffuser plate 180 may include multiple refractive extrusions 182 that may be arranged in a pattern including rows and columns. The refractive extrusions 182 may include extrusion peaks 184 divided by extrusion grooves 186. In some embodiments, the extrusion peaks 184 may be formed to include a peak angle 185 in the range from 120° and 170°. The structured refractive diffuser plate 180 may be formed using materials including a polycarbonate material and/or an acrylic material, among others.

Referring to FIG. 6B, the refractive extrusions 182 may include, for example, a quadrilateral base and four extrusion facets 188 that are configured to converge at the extrusion peak 184. In some embodiments, the refractive extrusions 182 may be considered as crossed linear prismatic refractive lenselets. In some embodiments, the refractive extrusions 182 may be configured using other base shape geometries such as, for example, hexagonal, circular, elliptical, and/or octagonal, among others.

Figure 7:
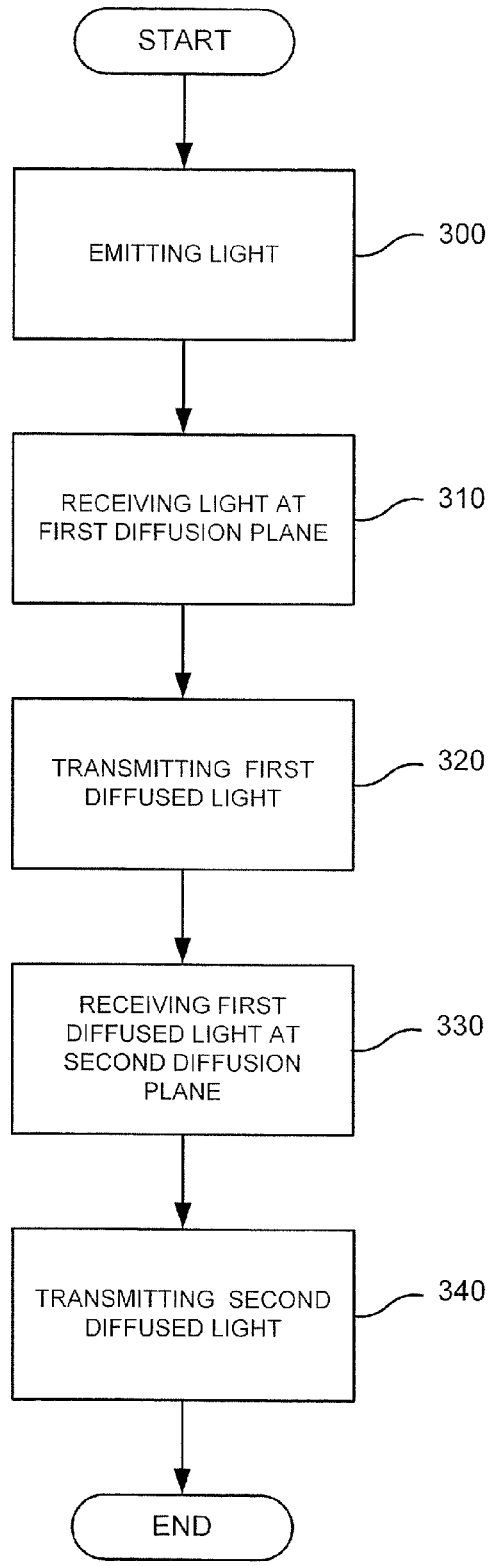
FIG. 7 is a block diagram illustrating operations for providing diffused light according to some embodiments of the invention.

Reference is now made to FIG. 7, which is a block diagram illustrating operations for providing diffused light according to some embodiments of the invention. Light may be emitted from multiple solid state light emitters arranged in a substantially planar configuration (block 300). The emitted light may be received at a first side of a first diffusion plane that is at a first distance from the solid state light emitters (block 310).

First diffused light may be transmitted from a second side of the first diffusion plane (block 320). In some embodiments, the first diffused light may be transmitted from a diffuser plate. In some embodiments, transmitting the first diffused light includes transmitting scattered diffusion light from a scattering diffuser plate. In some embodiments, the first diffused light is transmitted from a structured refractive diffuser plate.

The first diffused light is received at a first side of a second diffusion plane that is a second distance from the solid state light emitters (block 330). In some embodiments, the second diffusion plane may include a diffuser sheet and/or film that is supported by substantially transparent sheet and/or plate. Second diffused light is transmitted from a second side of the second diffusion plane (block 340).

In some embodiments, the solid state light emitters are positioned such that adjacent ones of the solid state light emitters are a third distance from one another. In some embodiments, the first distance may be approximately ½ of the third distance. In some embodiments, the second distance may be in a range including approximately 1.0 to 1.5 times the third distance value.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A solid state lighting device, comprising:
a plurality of solid state light emitters that are configured to emit light; and
a multiplane light diffuser including a first diffusion plane that is a first distance from the plurality of solid state emitters and a second diffusion plane that is a second distance from the plurality of solid state emitters that is different from the first distance, the multiplane light diffuser including first side that corresponds to the first plane and that is configured to receive the light emitted from the plurality of solid state light emitters and a second side that corresponds to the second plane and that is configured to transmit diffused light,
wherein the multiplane light diffuser comprises a diffuser plate that includes the first side of the multiplane light, the diffuser plate configured to define the first diffusion plane, and wherein the plurality of solid state emitters comprise a third distance between adjacent ones of the plurality of solid state light emitters, and wherein the first distance is a function of the third distance.

2. The device of claim 1, wherein the multiplane light diffuser comprises:
a diffuser sheet that includes the second side of the multiplane light diffuser and is positioned the second distance from the plurality of solid state light emitters, the diffuser sheet configured to define the second diffusion plane.

3. The device of claim 2, wherein the diffuser sheet comprises:
a substantially transparent plate; and
a diffuser film supported by the substantially transparent plate.

4. The device of claim 2, comprising a plurality of diffuser supports, wherein the diffuser supports comprise:
a proximal end that is configured to be positioned proximate the plurality of solid state light emitters; and
a distal end that is configured to support the diffuser sheet.

5. The device of claim 4, wherein the diffuser plate comprises a plurality of diffuser plate holes that are configured to receive the plurality of diffuser supports.

6. The device of claim 4, wherein the plurality of diffuser supports comprise steps for supporting, at the first distance from the plurality of solid state light emitters, the diffuser plate via the plurality of holes.

7. The device of claim 2, wherein the diffuser sheet comprises a diffuser film, a brightness enhancing film, a polarizing film and a substantially clear plate configured to support the diffuser film, the brightness enhancing film, the polarizing film.

8. The device of claim 2, wherein the plurality of solid state emitters comprise a third distance between adjacent ones of the plurality of solid state light emitters, and wherein the first distance comprises approximately one half the third distance.

9. The device of claim 2, wherein the second distance comprises a distance in a range between the third distance and 1.5 times the third distance.

10. The device of claim 1, wherein the diffuser plate comprises a plate including a light filter color.

11. The device of claim 1, further comprising means for transmitting first diffused light from the first diffusion plane to the second diffusion plane.

12. The device of claim 1, wherein the multiplane light diffuser comprises:
the first diffuser plate positioned at a first distance from the plurality of solid state emitters;
a second diffuser plate positioned at a second distance from the plurality of solid state emitters; and
a diffuser sheet supported by the second diffuser plate,
wherein the first distance is less than the second distance.

13. A method of providing diffused light comprising:
emitting light from a plurality of solid state light emitters arranged in a planar configuration;
receiving the emitted light at a first side of a first diffusion plane that is a first distance from the plurality of solid state light emitters;
transmitting first diffused light from a structured refractive diffuser plate at a second side of the first diffusion plane;
receiving the first diffused light from the first diffusion plane at a first side of a second diffusion plane that is a second distance from the plurality of solid state light emitters; and
transmitting second diffused light from a second side of the second diffusion plane,
wherein the plurality of solid state light emitters comprise a third distance between adjacent ones of the plurality of solid state light emitters, wherein the first distance is a function of the third distance.

14. The method of claim 13, wherein transmitting the first diffused light comprises transmitting the first diffused light from a diffuser plate and wherein transmitting the second diffused light comprises transmitting the second diffused light from a diffuser sheet that is supported by a substantially transparent sheet.

15. The method of claim 13, wherein transmitting the first diffused light comprises transmitting light from a first diffuser plate and wherein transmitting the second diffused light comprises transmitting light from a diffuser sheet that is supported by a second diffuser plate.

16. The method of claim 13, wherein transmitting the first diffused light comprises transmitting scattered diffusion light from a plate including a light filter color.

17. A display comprising:
a backlighting panel comprising
a plurality of solid state light emitters arranged in a substantially planar configuration including a third distance between adjacent ones of the plurality of solid state light emitters,
a first diffusion plane that is configured to receive light from the plurality of solid state light emitters and to transmit first diffused light, the first diffusion plane including a diffuser plate that is positioned a first distance from the plurality of solid state light;
a second diffusion plane that is configured to receive the first diffused light and to transmit second diffused light
a plurality of diffuser supports configured to support a first diffuser plane structure at a first distance from the plurality of solid state light emitters and to support a second diffuser plane structure at a second distance from the plurality of solid state light emitters, wherein the second distance is greater than the first distance; and
a LCD display panel that is configured to receive the second diffused light and selectively transmit received light as display content,
wherein the first distance is a function of the third distance.

18. The device of claim 1, wherein the diffuser plate comprises a structured refractive diffuser that includes a plurality of extrusion peaks that are divided by a plurality of extrusion grooves.

19. The device of claim 18, wherein the structured refractive diffuser comprises a plurality of crossed linear prismatic lenselets.

20. The device of claim 18, wherein ones of the plurality of extrusion peaks include a peak angle in a range of about 120 degrees to 170 degrees.

* * * * *